Dec. 12, 1939.  D. G. MOSS  2,183,323
MONOLONGERON CONSTRUCTION FOR HEAVIER-THAN-AIR CRAFT
Filed March 12, 1938
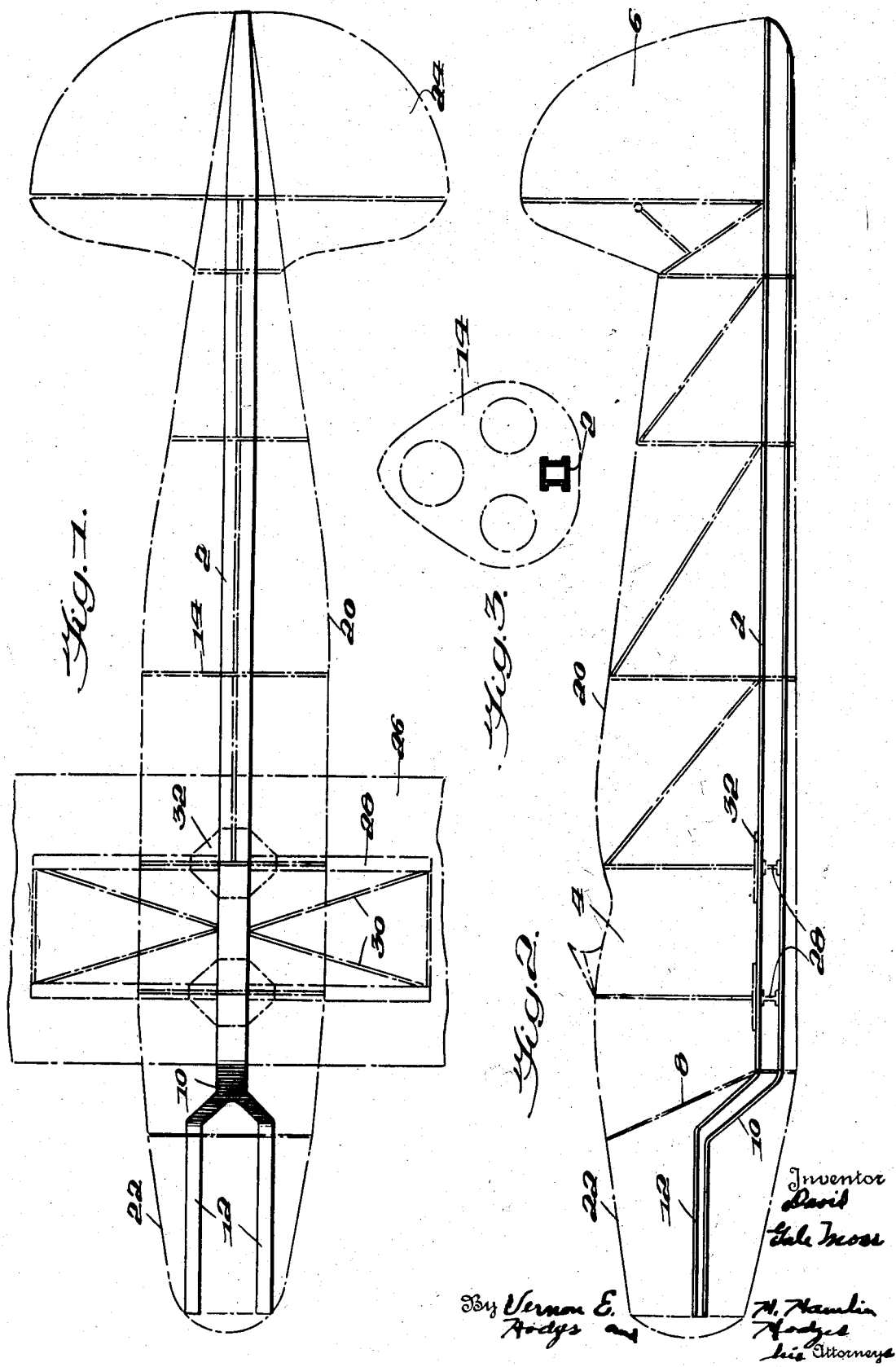

Patented Dec. 12, 1939

2,183,323

UNITED STATES PATENT OFFICE 2,183,323

MONOLONGÉRON CONSTRUCTION FOR HEAVIER-THAN-AIR CRAFT

David Gale Moss, El Dorado, Kans.

Application March 12, 1938, Serial No. 195,618

1 Claim. (Cl. 244—119)

This invention relates to an improvement in monolongéron construction for heavier-than-air craft.

The purpose of my invention is to provide a monolongéron which is designed to form the main framework for varying types and designs of heavier-than-air craft.

An object of my invention is to provide a monolongéron adapted to extend lengthwise through the fuselage of a heavier-than-air craft to provide a main bracing.

A further object of my invention is to provide a monolongéron which is designed to extend through the fuselage of an airplane and to provide a motor support.

A further object is to provide a monolongéron which will make a uniform frame to which all structural parts of the air craft may be attached, thus providing a framework around which all structural parts of an airplane may be built.

In the accompanying drawing:

Fig. 1 is a plan view showing the outline of a fuselage, a tail, and a broken-away portion of a wing in dot and dash lines;

Fig. 2 is a side elevation showing these portions of an airplane in dot and dash lines; and Fig. 3 is a cross-section through the fuselage showing a fairing support in dot and dash lines.

I provide a longéron 2 which may be made of any suitable material capable of withstanding the strains and stresses incident to the motion of an airplane during flight.

The longéron 2 extends from approximately the forward end of a cock-pit 4 to the rudder 6 of an airplane of any conventional type. At the forward end of the cockpit 4 a customary fire-wall 8 is provided to divide the cock-pit from a motor chamber. Continuing from the longéron 2 and extending angularly upwardly on the forward side of the fire-wall 8, I provide a portion 10 which is a continuation of the longéron 2. This extended portion 10 is divided to form a Y-shaped section.

From the individual legs of the Y-shaped section, further extending arms 12 are bent to a position approximately parallel with the longéron 2. These extended arms 12 are spaced apart and provide a suitable motor support in a position forward of the cock-pit 4 and the fire-wall 8.

The longéron 2 is preferably constructed of metal or some suitable alloy thereof to provide the necessary strength to withstand the stresses and strains incident to the motion of a heavier-than-air craft during flight. The longéron construction is preferably made in rectangular or square form, as shown in cross-section, Fig. 3, in which a conventional fairing support or fuselage bracing 14 is shown.

For clarity in the understanding of my monolongéron construction in conjunction with the building of a heavier-than-air craft, I have shown in dot and dash lines the outline of a fuselage 20, an engine cowling 22, a rudder 6, elevator 24, and a wing 26.

In using my monolongéron construction, airplane designers may consider that at certain points on the monolongéron additional strength is necessary to take care of stresses and strains at that particular point. If it is found necessary to increase the strength of the monolongéron, this may be done by reinforcing the monolongéron with some of the same or similar material at these critical points. It is possible to strengthen the monolongéron at such critical points by welding, riveting, or "spot"-welding to properly strengthen the construction at such critical points.

While I have shown a construction by which a wing 26 may be properly braced by the spar-studs 28 and spar stud bracing 30, and attached to my monolongéron by the use of torsional plates 32, yet it will be understood that other constructions may be utilized in attaching the necessary fuselage structure to my monolongéron which forms the main frame of the aircraft.

It will be understood that the fundamental basis of my monolongéron construction may be readily modified, in its form and shape, so that a monolongéron may be used in conjunction with the construction of widely varying designs of heavier-than-air craft.

In such varying designs, the monolongéron structure is adapted to be the main load carrying structure, while other parts which may be uniform in their fabrication are utilized in order to transmit the various loads to the monolongéron structure.

I claim:

An airplane longéron which extends in a straight line centrally at the lower portion of the airplane from one extreme end to the other, and divides at its forward end into an open fork constituted by two substantially parallel arms, which constitute a forward extension of the main portion of the longéron, and are adapted to form a suitable motor support in position forward of the cockpit and firewall of the airplane.

DAVID GALE MOSS.